United States Patent
Weaver

[15] 3,697,040
[45] Oct. 10, 1972

[54] TOOL OFFSET MEANS FOR TRACER MECHANISMS

[72] Inventor: Paul J. Weaver, San Marino, Calif.

[73] Assignee: Automatic Control Systems, Inc., El Monte, Calif.

[22] Filed: Dec. 23, 1970

[21] Appl. No.: 100,955

[52] U.S. Cl. ..............................251/3, 90/62, 82/14
[51] Int. Cl. ..............................................B23q 35/18
[58] Field of Search .......90/62, 13 R; 82/14 A, 14 R; 251/3

[56] References Cited

UNITED STATES PATENTS

| | | | |
|---|---|---|---|
| 2,557,876 | 6/1951 | Klema | 90/62 |
| 2,891,573 | 6/1959 | Dobleske | 251/3 X |
| 3,270,619 | 9/1966 | Magor | 251/3 X |
| 3,309,950 | 3/1967 | Weaver | 82/14 |

Primary Examiner—Andrew R. Juhasz
Assistant Examiner—Z. R. Bilinsky
Attorney—Angus & Mon

[57] ABSTRACT

A tracer valve for controlling a machine tool for duplicating on a workpiece the contour of a template or pattern. For a given tool setup, the offset of the stylus from the tracer valve sensor is known and geometry, for in the system's geometry. including the geometry of the tools being used. However, when a different machining operation is to be performed, or when a new tool is used for a second operation of the same kind, the offset must often be changed. This invention provides a means for pre-setting and for changing tool offsets in order that sequential operations can be carried out without changing the template and even without changing the tool for a given setup. It includes a stylus support having three pivoted links and four pivots, one pivot being a joinder with the tracer sensor whereby the latter is semi-fixed in space and acts as a fulcrum in determining the offset of the stylus tip from the tracer sensor.

12 Claims, 3 Drawing Figures

PATENTED OCT 10 1972 3,697,040
SHEET 1 OF 2
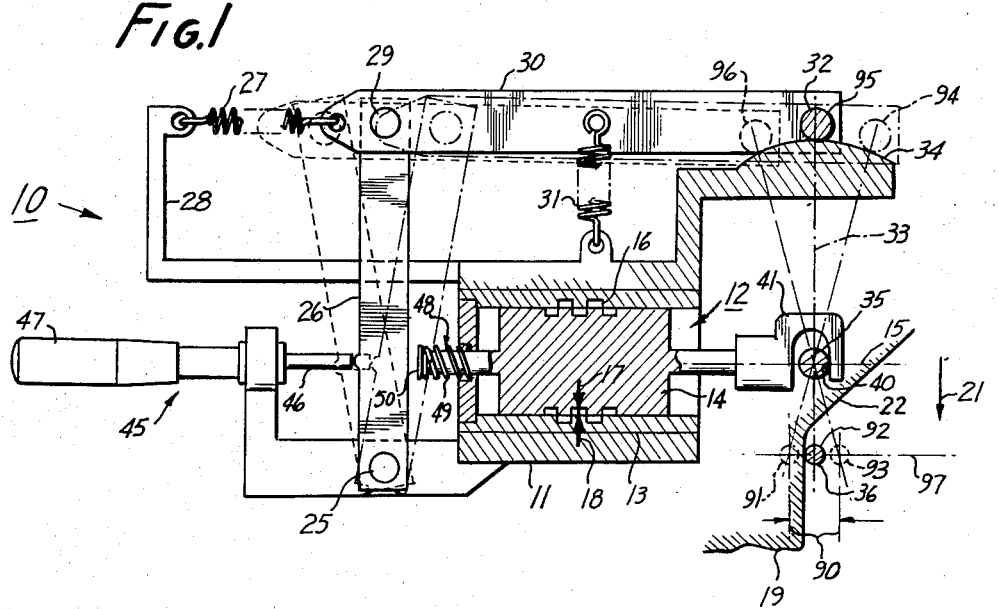
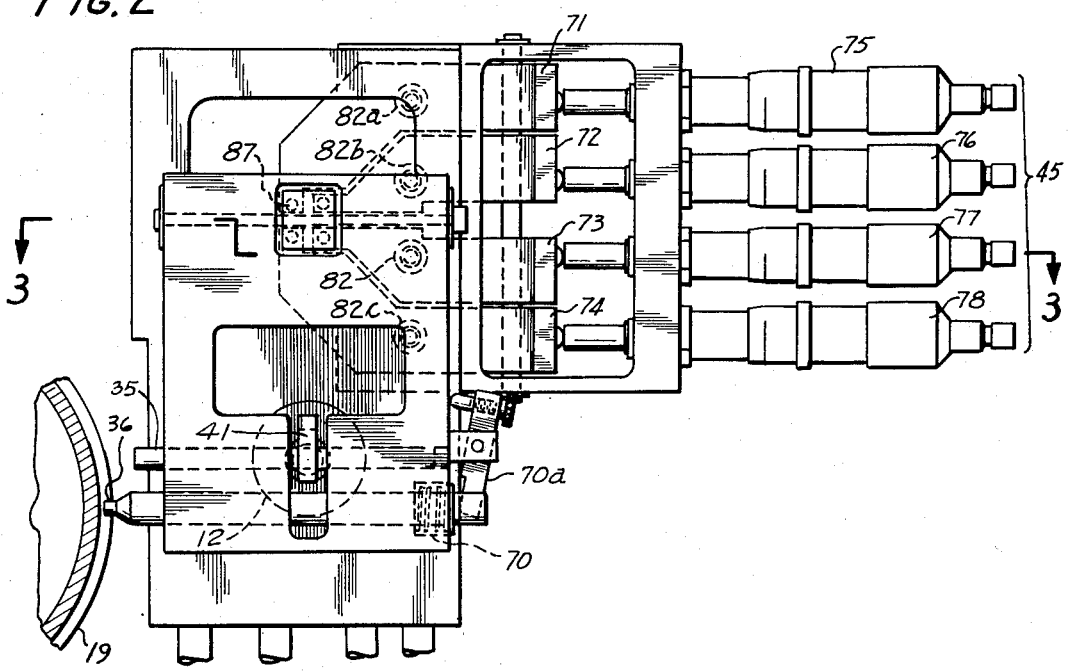
INVENTOR.
PAUL J. WEAVER
BY Angus & Mou
ATTORNEYS.

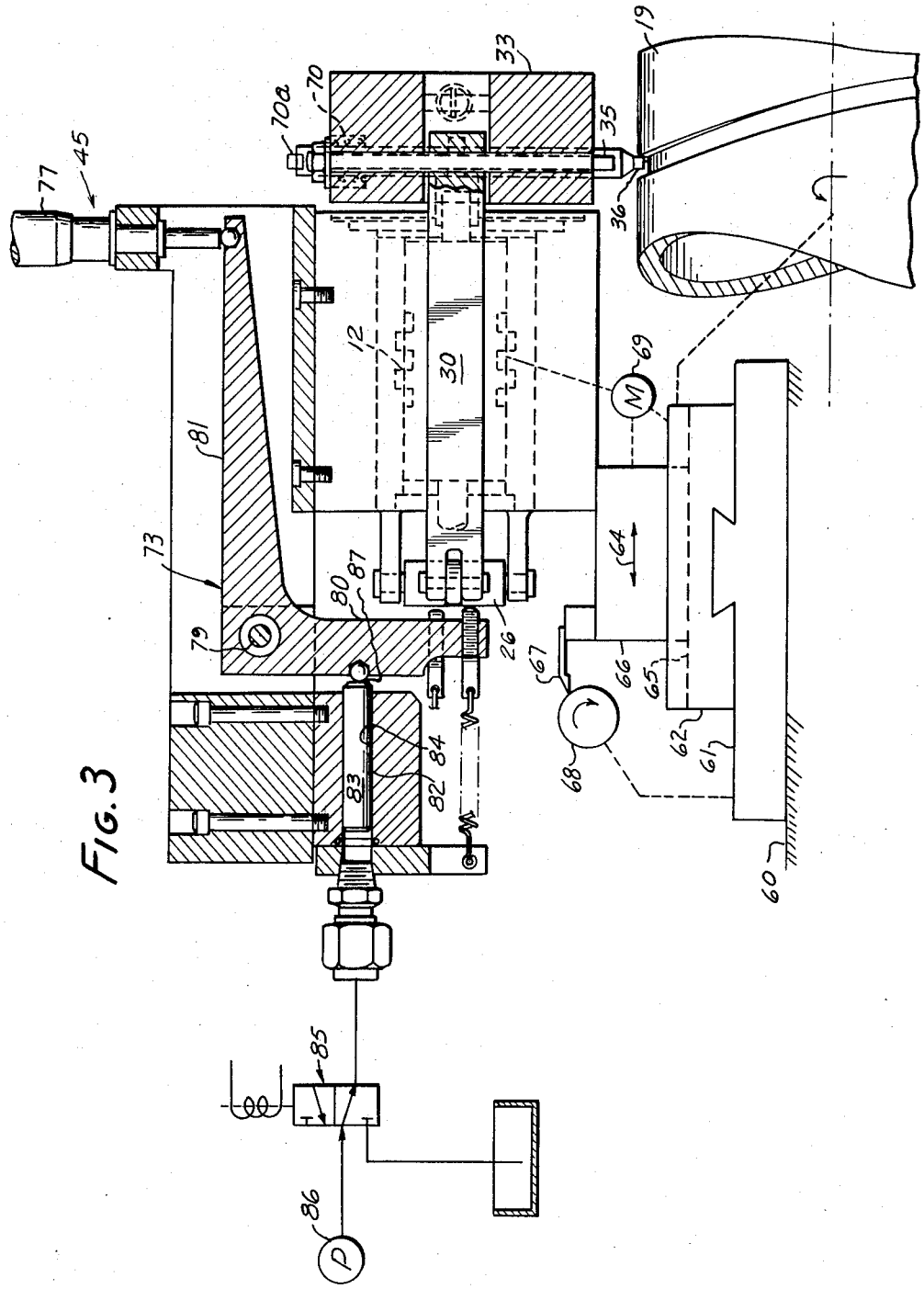

TOOL OFFSET MEANS FOR TRACER MECHANISMS

This invention relates to tracer mechanisms and to means for changing the offset of a tracer stylus from the tracer sensor, which is often called the "tool offset."

In tracer-controlled machine tools, the offset of the stylus from the tracer valve sensor is known and accounted for in the system's geometry, including the geometry of the cutting tools being used. However, when a different machining operation is to be performed, such as in changing from facing to side cuts, or when a new tool is used for a second operation of a like kind, a different offset is frequently called for. This has heretofore resulted in the need to change the entire setup, and frequently requires either changing of the tools or changing of the templates, or unloading and reloading the machine. This invention provides a means for pre-setting and for changing tool offsets so that sequential operations can be carried out without changing the template, without handling the part, and even without changing the tool itself.

This invention is carried out with the use of a tracer element of the class which includes a tracer sensor having a null condition and two operative conditions, the tendency of the system being to seek the null condition in the sensor. A stylus pin follows the contour of a template or pattern and is adapted to have variably adjustable the spacing between the sensor and the stylus pin, which directly affects the spacing of the sensor and the workpiece. The mechanism includes a frame adapted to be mounted to a machine tool and a tracer element mounted to the frame. The tracer element includes a sensor element. A finger is attached to the sensor element and has an axis of motion which, when the finger moves along the axis, results in a change of condition of the sensor element. A contact surface on the finger faces along said axis. A first link is pivoted to the frame by a first pivot, a second link is pivoted to the first link by a second pivot, and a third link is pivoted to the second link by a third pivot, all of these pivots being spaced from one another. A bearing pin and a stylus pin are carried by, project from, and are spaced apart along the third link.

The bearing pin is adapted to bear against the contact surface, and the stylus pin is adapted to bear against a template or pattern to be traced. A stabilizer surface on the frame is contacted by the second link. First and second bias means bias the first and second links, respectively, and third bias means biases the contact surface toward the bearing pin. Adjustable means determines the angular position of the first link in opposition to the first bias means, whereby a change in the adjustable means rotates the first link around the first pivot, moves the second link along the stabilizer surface, and shifts the stylus pin by virtue of rotation of the third link around the bearing pin.

According to a preferred but optional feature of the invention, a contactor is pivotally mounted to the frame, and is contactible by the adjustable means to limit its rotation in one angular direction. Force means is mounted to the frame so disposed and arranged as to bear against the contactor to urge it against the adjustment means, the first link bearing against the said contactor under the bias of the first bias means.

According to still another preferred but optional feature of the invention, there is provided a plurality of said contactors, adjustable means, and force means, the force means being individually actuable so as to select that one of the contactors and adjustable means which is at the time to be effective on the first link.

The above and other features of this invention will be fully understood from the following detailed description and the accompanying drawings, in which:

FIG. 1 is a primarily schematic view partially in axial cross-section, showing the invention and its theory of operation;

FIG. 2 is a side view of the presently preferred embodiment of the invention; and FIG. 3 is a cross-section taken at line 3—3 of FIG. 2.

The device will first be disclosed using schematic notation in FIG. 1, wherein a tracer mechanism 10 is shown which includes a frame 11 adapted to be attached to a machine tool. This frame serves to mount a tracer element 12, which may conveniently be a spool valve type of the class generally shown in Rosebrook U.S. Pat. No. 2,753,145, issued on July 3, 1956, to which reference may be made for a more complete disclosure. The operation of tracer valves is well known to persons skilled in the art and likely to be interested in this invention. The valve shown is only one example of tracer elements. Other types are electronic or electric and pneumatic, as may be best suited to the project at hand. In this case, a hydraulic spool valve is shown as the tracer sensor, which includes a sleeve 13 and a spool 14, the spool being axially slidable along axis 15. It is conventional for grooves 16 to be provided in the spool and sleeve, which selectively overlap depending upon the position of the spool in the sleeve. The null condition is shown in FIG. 1 with arrows 17, 18 aligned, at which condition the system is in equilibrium. Shifting of the spool in either direction from null will selectively cause various ones of the grooves to overlap and provide power to motors which will shift machine tool components relative to one another with the objective of restoring the spool valve to its null condition. In the course of this, the stylus will have followed a template or pattern configuration, and a cutting tool will have moved along an axis in response to the data on the template. This is common knowledge and need not be stated in greater detail herein.

A template 19 is shown in FIG. 1 as a flat template with a direction of feed 21. It may be, instead, a cylindrical template as shown in FIG. 3, in which case its axis of rotation would be parallel to axis 15. In either case, a surface of the template is contacted by the stylus pin, and motion of the surface past the pin causes a relative reaction between the template and the tracer system.

The object of the invention is to cause the contour 22 of the template to be traced. In the case of a cylindrical template, the contour followed is the wall of a groove. A first pivot 25 pivotally mounts a first link 26 to the frame. The link is swingable in the plane of FIG. 1 and is biased by a first bias means 27 toward a frame extension 28, bias means 27 conveniently being a coil spring.

A second pivot 29 pivots a second link 30 to the first link, and second bias means 31, typically a coil spring, biases the second link. A third pivot 32, which may include a lateral extension, pivotally joins a third link 33 to the second link. The third link is shown schematically only as dashed lines in order to maintain the clarity of the drawing in this region. All of the links are elongated, rigid rods or bars. A stabilizer surface 34 is formed on the frame and may be a developed curve for a purpose yet to be disclosed. The second bias means biases the second link against the stabilizer surface so that it will follow it as the second link moves to the right and left in FIG. 1. Contact of the second link with stabilizer surface 34 is made by the lateral extension of third pivot 32.

A bearing pin 35 projects laterally from the third link as does a stylus pin 36. Pins 35 and 36 are spaced apart from one another. It will now be seen that pivotal movement of the first link will cause pivotal movement of the third link. For this purpose a contact surface 40 is formed on a finger 41, which is attached to the sensor element of the tracer element. This contact surface faces along axis 15 and extends laterally relative thereto so that the bearing pin can both rest against it and move laterally along it.

Adjustable means 45 is fixed to the frame and preferably comprises a screw 46, forming a part of a micrometer 47. It will be seen that the tendency of the first bias means is to move the first link toward the adjustable means, and its motion in that direction will be limited. Force means (shown in other Figs. yet to be described) opposes this motion.

Third bias means 48 comprises a coil spring 49, which bears against a stud 50 projecting from the valve spool so as to bias the contact surface to the left, and causes it to bear against the bearing pin. This motion will cause the stylus pin to bear against the surface of the template being followed.

The details of the foregoing will now be repeated in connection with FIGS. 2 and 3, together with certain other additional features, identical numbers being used wherever possible. FIG. 3 shows a machine tool base 60 with longitudinal ways 61 having a saddle 62 adapted for motion along that axis. Motion along cross-axis 64 is permitted by dove-tail ways 65 which mount a cross-slide 66 which supports a cutting tool 67, effective to work upon a workpiece 68 in a manner common to lathes. Motor 69 controls the motion of the cross-slide and is interposed between the cross-slide and the saddle, and is under control of the tracer element as shown by the dotted lines leading to the motor.

The template is a rotary template mounted to the longitudinal member, namely the saddle 62, so as to control the cross-motion. This template bears no resemblance to the shape of the part. In following the groove, the stylus and its controlled tracer element merely controls motion along one axis. Coordinated motion along other axes results in the final configuration of the part. It will be understood that this is simply one illustration of means of utilizing this device for control along a single axis and may be adapted to any other axis as desired.

It will also be noted that the frame 11 is mounted to the cross-slide so that the cutting tool and tracer element are related to the cross-slide, while the template and the workpiece are related to the machine frame, one through the saddle and the other through the base of the machine tool. This is a common arrangement in tracer valve devices. In FIG. 2 it will be noted that the stylus pin is elongated and includes a spring relief 70 with a limit arm 70a to enable the stylus pin to rise over abrupt changes in contour of the template and is a safety feature.

In FIGS. 2 and 3 additional means are shown which are not illustrated in the simplified drawing of FIG. 1. Principal among these is a set of contactors 71, 72, 73, 74. Only contactor 73 is shown in detail in FIG. 3, together with certain other systems, it being recognized that these are all duplicated in all of the sets.

Adjustable means 45 is shown as constituting a plurality of micrometers 75, 76, 77, 78 in order to provide for four various offset adjustments, one for each contactor. The respective contactors are preferably crank arms, contactor 73 being shown in detail in FIG. 3. The others resemble it. Contactor 73 rotates around pivot 79 and includes a pair of arms 80, 81. Arm 81 is adapted to bear against its respective adjustable means 77, while arm 80 is adapted to bear against a respective force means 82, there being one of these force means for each respective one of the arms of the contactors (82a, b, and c).

As can best be seen in FIG. 3, the force means comprises a fluid-actuated plunger 83 in bore 84 in the frame, which is adapted under fluid pressure exerted from the left side to bear against arm 80 in opposition to the first bias means (not shown in FIGS. 2 and 3).

The control system for the force means is a three-way valve which may be a solenoid valve 85 adapted to take fluid under pressure from a pump 86 or other source of fluid under pressure and selectively apply it to the plunger so as to exert a force, or to vent the plunger so as to relax the force against arm 80 in opposition to the first bias means. Selector means (not shown) are provided to select which of the respective solenoid valves is to be actuated, and thereby provides a means for selecting a particular tool offset from the group.

It will be noted (FIG. 2) that the contact points 87 of the contactors are gathered in a relatively small area so as to contact the first link in a relatively small area. For this purpose, the various arms of the contactors are shaped to provide a contact area in this area.

The operation of this device will be understood from an examination of the drawings. The bearing pin 35 constitutes a semi-fixed point in space along the axis for the reason that the tendency of the machine tool control system is to restore the valve to its null condition, which is a fixed point relative to the frame. Therefore, it follows that there is a unique line in space normal to the axis 15 in the plane of FIG. 1 upon which the machine tool is always tending to restore the center of the bearing pin. The third link thereby pivots around this bearing pin acting as a fourth pivot (which this bearing pin is sometimes called) when the valve is near null, as respects the offset. The third link pivots around the third pivot for its tracing operation.

The offset is shown by dimension 90, and three positions 91, 92, 93 are shown which are respective to three positions 94, 95, 96 of the point of contact of the second link along the stabilizer surface. The positions 91, 92, 93 are disposed along a straight line 97, and this is accomplished by a lateral shifting of the bearing pin along the contact surface as derived from the shape of the stabilizer surface. This shape is developed to create the straightline motion of the stylus pin along line 97 when the first link is rotated. When the tool offset is to be changed, the respective micrometer is adjusted, and the first bias means moves the first link, either directly or through the contactor, against the adjustable means as a limitation, and this will shift the stylus pin to the desired point. When this is accomplished selectively, using the various ones of the contact points 87, only the actuated one of the fluid plungers will cause a respective contactor to abut its respective adjustable means, and it is this element which will exert the limitation on the first link. The others, because they are vented, will exert no force on the contactor and can readily be overcome by the first bias means, should their position be such that they would first be struck by the first link. Thus, in FIGS. 2 and 3, movement of the first link caused by the first bias means is limited by the adjustment means, with the difference that, where as in FIG. 1 the first link makes a direct abutment with the adjustment means, in FIGS. 2 and 3, abutment is made with a contactor which in turn makes a direct abutment with the adjustment means.

While the axial position of the bearing pin will shift during the operation of the valve by virtue of motion of the stylus along the template, the tendency will be for the machine tool to restore the spool or other sensor element to its central or null position from whichever operative position on either side thereof it was moved to, and at this null position the offset will be that which was desired and previously set by the device. It will, therefore, be recognized that this device provides a straight-forward means for adjusting the offset of the system and for enabling it to be pre-set to a number of offsets, the one to be affected to be selectible simply by selecting which of the four force means will be pressurized at the given time.

It will be noted in FIGS. 2 and 3 that there is only one each of the various links and of the first bias means and that the multiplication of the adjustable means and force means and contactors is for the purpose of enabling the pre-selection of a plurality of offset means. The device may be used in the configuration shown in FIG. 1 should it only be desired to change the offset from time to time by manual adjustment, without having instant selectibility to pre-set offsets.

This invention is not to be limited by the embodiments shown in the drawings and described in the description which are given by way of example and not of limitation but only in accordance with the scope of the appended claims.

I claim:

1. A tracer mechanism of the class which includes a tracer sensor having a null condition and two operative conditions, and a stylus pin for following the contour of a template or a pattern, and adapted to have a variably adjustable spacing between said sensor and stylus pin, said tracer mechanism comprising: a frame; a tracer element mounted to said frame, said tracer element including a sensor element; a finger attached to the sensor element and having an axis of motion which, when the finger moves along said axis, results in a change in condition of the sensor element; a contact surface on said finger facing along said axis; a first link pivoted to the frame at a first pivot, a second link pivoted to the first link at a second pivot, a third link pivoted to the second link at a third pivot, all pivots being spaced from one another; a bearing pin and a stylus pin carried by, projecting from, and being spaced apart on the third link, the bearing pin being adapted to bear against the contact surface, and the stylus against a template or pattern to be traced; a stabilizer surface on the frame contacted by the second link; first and second bias means biasing the first and second links, respectively, and third bias means biasing the contact surface toward the bearing pin; and adjustable means determining the angular position of the first link in opposition to the first bias means, whereby a change of adjustment of said adjustable means rotates the first link around the first pivot, moves the second link along the stabilizer surface, and shifts the stylus pin by virtue of rotation of the third link around the bearing pin.

2. A tracer mechanism according to claim 1 in which the tracer sensor comprises a pair of elements, one of which is axially shiftable relative to the other along said axis, in which the third bias means is a spring biasing the shiftable element so as to press the contact surface against the bearing pin, and in which the second bias is a spring biasing the second link against the stabilizer surface.

3. A tracer mechanism according to claim 2 in which the stabilizer surface is of a shape developed such that when the first link is rotated, the second link moves along said stabilizer surface in a path parallel to the said axis.

4. A tracer mechanism according to claim 2 in which the adjustable means comprises a screw mounted to the frame.

5. A tracer mechanism according to claim 2 in which a contactor is pivotally mounted to the frame, and is contactible by the adjustable means to limit its rotation in one angular direction, and in which force means is mounted to the frame so disposed and arranged as to bear against the contactor to urge it against the adjustment means, the first link bearing against the said contactor under the bias of the first bias means.

6. A tracer mechanism according to claim 5 in which the force means is adapted to exert or relax its force upon command, whereby the first bias means can overcome the force means in one of said conditions, and be overcome by the force means in the other.

7. A tracer mechanism according to claim 5 in which a plurality of said contactors and an equal number of said adjustable means is provided, each being separately adjustable and individually and selectively effective on said first link, there being an equal number of said force means and contactors, each effective upon an individual respective one of said contactors.

8. A tracer mechanism according to claim 7 in which each of said force means is adapted to exert or relax its force upon command, whereby the first bias means can overcome the force means in one of said conditions, and be overcome by the force means in the other, the force means being individually selectible as to actuation or relaxation.

9. A tracer mechanism according to claim 8 in which each adjustable means comprises a screw mounted to the frame.

10. A tracer mechanism according to claim 9 in which the screw is a micrometer.

11. A tracer mechanism according to claim 8 in which each contactor is a pivoted crank with a pair of arms, one arm being contactible by the force means and the other by the adjustable means, and one of said arms being contactible by said first link.

12. A tracer mechanism according to claim 11 in which the adjustable means is a micrometer.

* * * * *